(12) United States Patent
Jones et al.

(10) Patent No.: US 7,055,854 B2
(45) Date of Patent: Jun. 6, 2006

(54) SNAP-IN CASTANET AIRBAG MODULE FOR A VEHICULAR STEERING WHEEL

(75) Inventors: David V. Jones, South Weber, UT (US); Eugene R. Dearden, Layton, UT (US); David W. Hansen, Clearfield, UT (US)

(73) Assignee: Autoliv ASP, Inc., Ogden, UT (US)

( * ) Notice: Subject to any disclaimer, the term of this patent is extended or adjusted under 35 U.S.C. 154(b) by 60 days.

(21) Appl. No.: 10/792,536

(22) Filed: Mar. 3, 2004

(65) Prior Publication Data

US 2005/0194766 A1  Sep. 8, 2005

(51) Int. Cl.
B60R 21/16 (2006.01)
(52) U.S. Cl. .................... 280/731; 280/728.2
(58) Field of Classification Search ............... 280/731, 280/728.2; 200/61.55, 61.54
See application file for complete search history.

(56) References Cited

U.S. PATENT DOCUMENTS

| | | | |
|---|---|---|---|
| 5,380,037 A * | 1/1995 | Worrell et al. ........... 280/728.2 |
| 5,470,100 A * | 11/1995 | Gordon .................... 280/728.2 |
| 6,196,573 B1 | 3/2001 | Worrell et al. |
| 6,276,711 B1 | 8/2001 | Kurz et al. |
| 6,402,193 B1 | 6/2002 | Fleckenstein |
| 6,554,312 B1 * | 4/2003 | Sakane et al. ........... 280/728.2 |
| 6,675,675 B1 * | 1/2004 | Sauer et al. .................. 74/552 |
| 6,682,092 B1 * | 1/2004 | Schütz et al. ............... 280/731 |
| 2002/0153714 A1 * | 10/2002 | Kreuzer ..................... 280/731 |
| 2002/0175505 A1 | 11/2002 | Heindl |
| 2003/0173759 A1 | 9/2003 | Grenier |
| 2004/0017068 A1 * | 1/2004 | Weis et al. ................. 280/731 |

FOREIGN PATENT DOCUMENTS

| | | |
|---|---|---|
| DE | 197 25 684 | 12/1998 |
| DE | 200 17 527 U1 * | 3/2001 |
| EP | 1 179 457 | 2/2002 |
| FR | 2 790 044 | 8/2000 |
| JP | 2001-233159 A * | 8/2001 |

* cited by examiner

Primary Examiner—Ruth Ilan
(74) Attorney, Agent, or Firm—Sally J Brown

(57) ABSTRACT

An airbag module for a vehicular steering wheel, the airbag module including a snap ring mountable to the vehicular steering wheel and a housing connected to the snap ring and pivotally movable with respect to the vehicular steering wheel.

19 Claims, 4 Drawing Sheets

SNAP-IN CASTANET AIRBAG MODULE FOR A VEHICULAR STEERING WHEEL

BACKGROUND OF THE INVENTION

This invention relates generally to an airbag module for a vehicular steering wheel and, more particularly, to an airbag module pivotally mountable to a vehicular steering wheel.

It is well known to protect a vehicle occupant using a cushion or bag, e.g., an "airbag," that is inflated or expanded with gas when the vehicle encounters sudden deceleration, such as in a collision. In such systems, the airbag cushion is normally housed in an uninflated and folded condition to minimize space requirements. Upon actuation of the system, the cushion begins being inflated in a matter of no more than a few milliseconds with gas produced or supplied by a device commonly referred to as an "inflator."

Typically, vehicular steering wheels are equipped with an airbag module that is mounted to the vehicular steering wheel for containing or holding an inflatable airbag cushion, such as to protect the driver in the event of a frontal impact or collision. A cover is typically attached or connected to an airbag module housing such as for aesthetic purposes and may also serve to maintain the airbag within the airbag module housing until deployment.

In such an arrangement, in order to activate a vehicular horn or warning signal, the airbag module and/or the cover is typically biased in an initial position, for example by springs, and displaceable with respect to the steering wheel, for example by applying a force or pressure to the cover to move the airbag module and/or cover towards the steering wheel. Such movement activates the horn assembly by allowing horn assembly contacts, electrically connected to the vehicle horn assembly, to contact stationary horn contact points. When the force or pressure is released, the springs bias the airbag module and/or the cover towards the initial position providing a gap or space between the horn assembly contacts. Such design requires close manufacturing tolerances in the production and manufacturing of the components and complicated installation, which is time-consuming and costly.

Thus, there is a continuing need and demand for an airbag module that can be easily produced and manufactured, and easily mounted to a vehicular steering wheel.

SUMMARY OF THE INVENTION

A general object of the invention is to provide an improved airbag module for a vehicular steering wheel.

A more specific objective of the invention is to overcome one or more of the problems described above.

The general object of the invention can be attained, at least in part, through an airbag module for a vehicular steering wheel, which includes a snap ring mountable to the vehicular steering wheel and a housing connected to the snap ring and pivotally movable with respect to the vehicular steering wheel.

The prior art generally fails to provide an airbag module having a housing design that does not require close manufacturing tolerances in the production and manufacturing of the components and complicated installation. More specifically, the prior art generally fails to provide an airbag module having a housing that is pivotally movable with respect to the vehicular steering wheel.

The invention further comprehends an airbag module for a vehicular steering wheel including a housing having a first mounting leg. A snap ring is mounted to the first mounting leg. The housing of the airbag module is pivotally movable about the snap ring with respect to the vehicular steering wheel.

The invention still further comprehends an airbag module for a vehicular steering wheel including a housing. A first mounting leg is formed on the housing, and forms a groove to define a pivot point. A second mounting leg is formed on the housing and forms a gap. A snap ring is mounted with respect to the vehicular steering wheel. A first portion of the snap ring is pivotally mounted within the groove formed by the first mounting leg and a second portion of the snap ring is movably positioned within the gap formed by the second mounting leg. The housing is pivotally movable about the pivot point with respect to the vehicular steering wheel.

As used herein, references to the term "snap-in" when describing the airbag module of the present invention are to be understood to refer to the connection or attachment of the airbag module to the vehicular steering wheel, e.g. the airbag module can be press-fit or snapped onto the vehicular steering wheel.

Further, as used herein, references to the term "castanet" when describing the airbag module of the present invention are to be understood to refer to an airbag module having a first end portion fixed with respect to a structure, such as the vehicular steering wheel, and a second end portion that is movable with respect to the vehicular steering wheel about a pivot point defined at the fixed first end portion.

Other objects and advantages will be apparent to those skilled in the art from the following detailed description taken in conjunction with the appended claims and drawings.

DETAILED DESCRIPTION OF THE INVENTION

Figure 1:
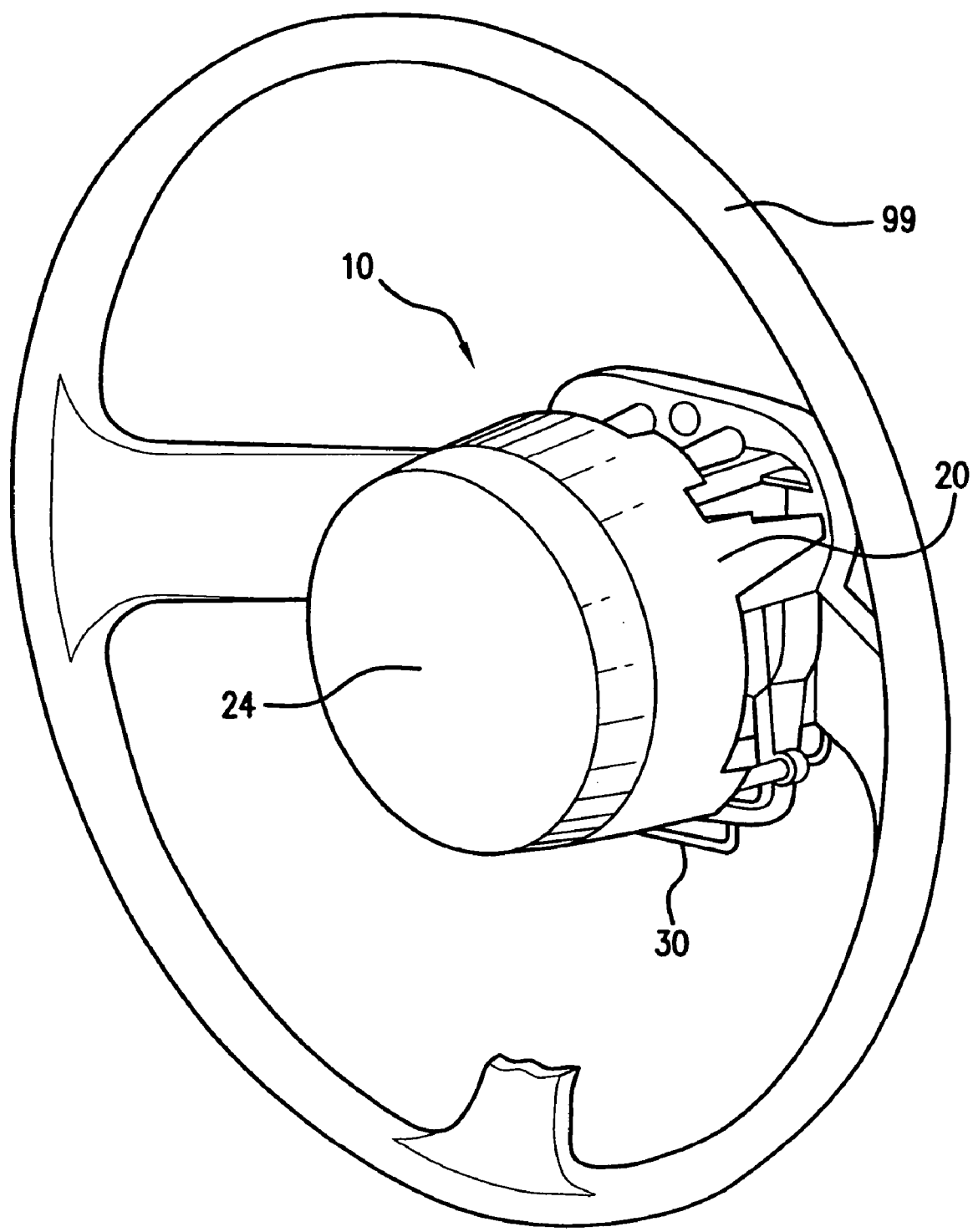
FIG. 1 is a front perspective view of an airbag module and associated assembly components mounted to a vehicular steering wheel, according to one preferred embodiment of this invention.
Figure 2:
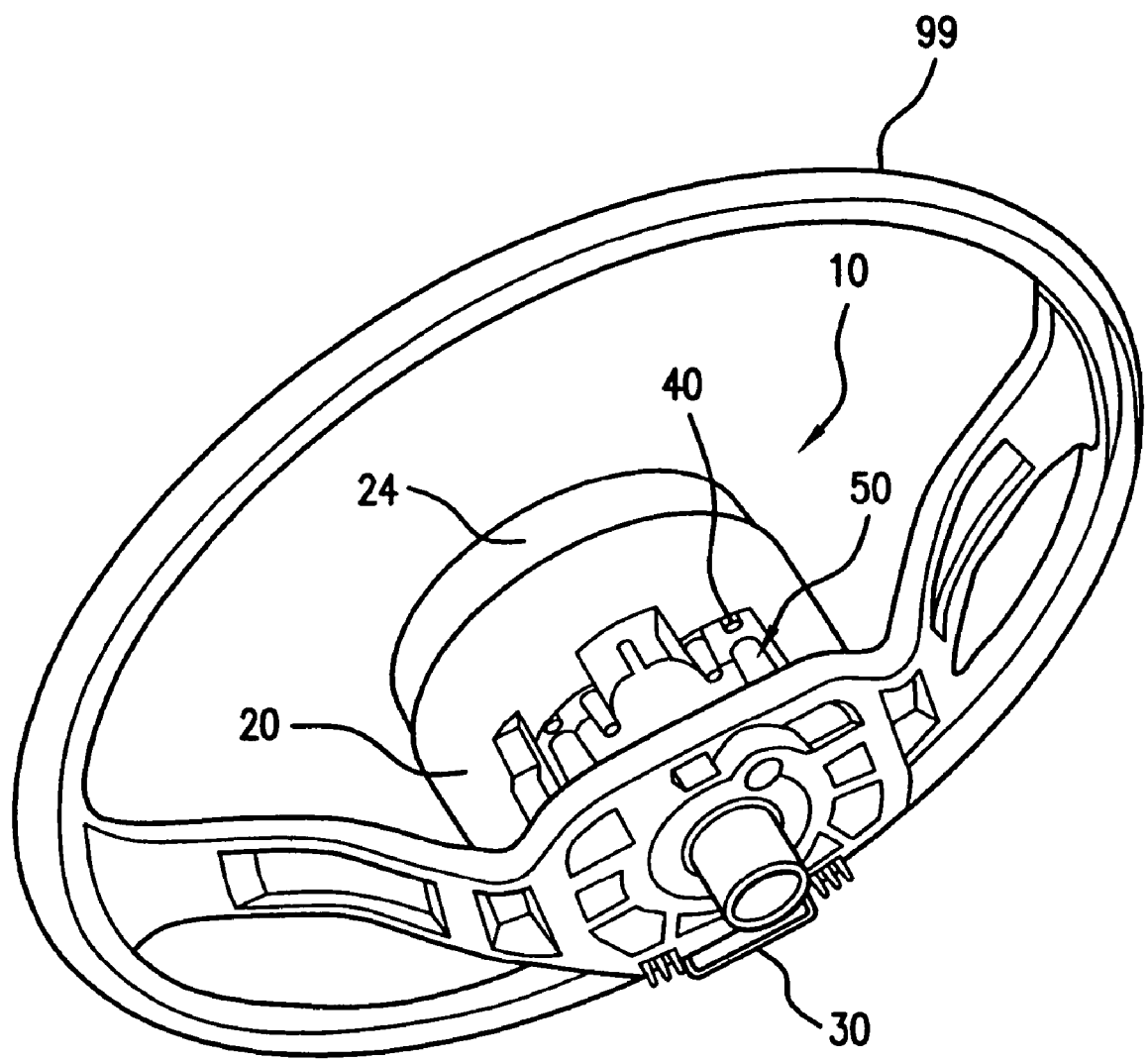
FIG. 2 is a back perspective view of an airbag module and associated assembly components mounted to a vehicular steering wheel, according to one preferred embodiment of this invention.

The present invention provides an airbag module mountable or attachable to a vehicular steering wheel. The airbag module as described herein can be referred to as a snap-in castanet airbag module. Turning to FIGS. 1 and 2, there is shown an airbag module according to preferred embodiments of this invention and generally designated by the element reference numeral 10, mounted on or to a vehicular steering wheel 99. As will be appreciated by those skilled in the art and guided by the teachings herein provided, the broader practice of the invention is not limited by or to specific or particular vehicular steering wheels. Thus, in particular instances, a suitable vehicular steering wheel may be a car or a truck steering wheel, for example.

Figure 3:
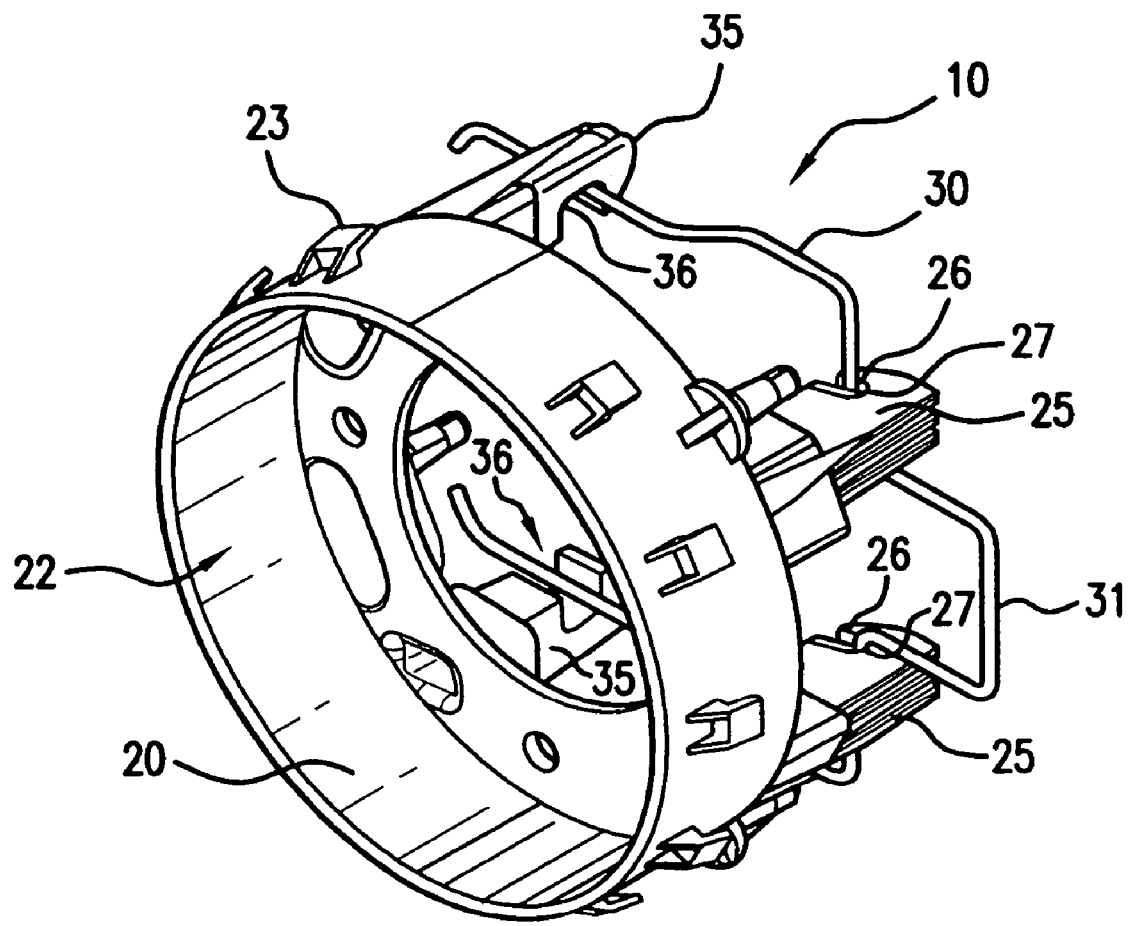
FIG. 3 is a perspective view of an airbag module for a vehicular steering wheel, according to one preferred embodiment of this invention.

The airbag module 10 comprises a housing 20 made of any suitable material. Preferably, but not necessarily, the housing 20 is made of a molded or fabricated plastic material. Other suitable materials may be used for the housing 20, such as metal, alloy and composite materials having sufficient strength, and such as known to those having ordinary skill in the art and guided by the teachings herein provided. As shown in FIG. 3, the housing 20 preferably has a generally cylindrical shape and forms a void or compartment 22 for housing an inflatable restraint airbag cushion 100. Any suitable inflatable restraint airbag cushion 100 known to those skilled in the art and guided by the teachings herein provided can be positioned within the housing 20 in accordance with the invention.

Figure 4:
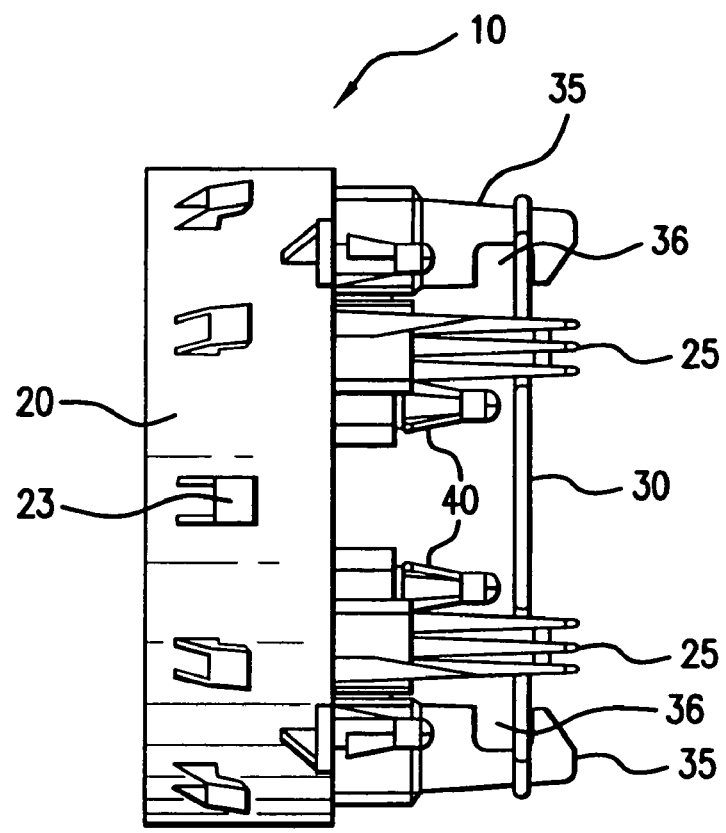
FIG. 4 is a side view of the airbag module shown in FIG. 3.
Figure 5:
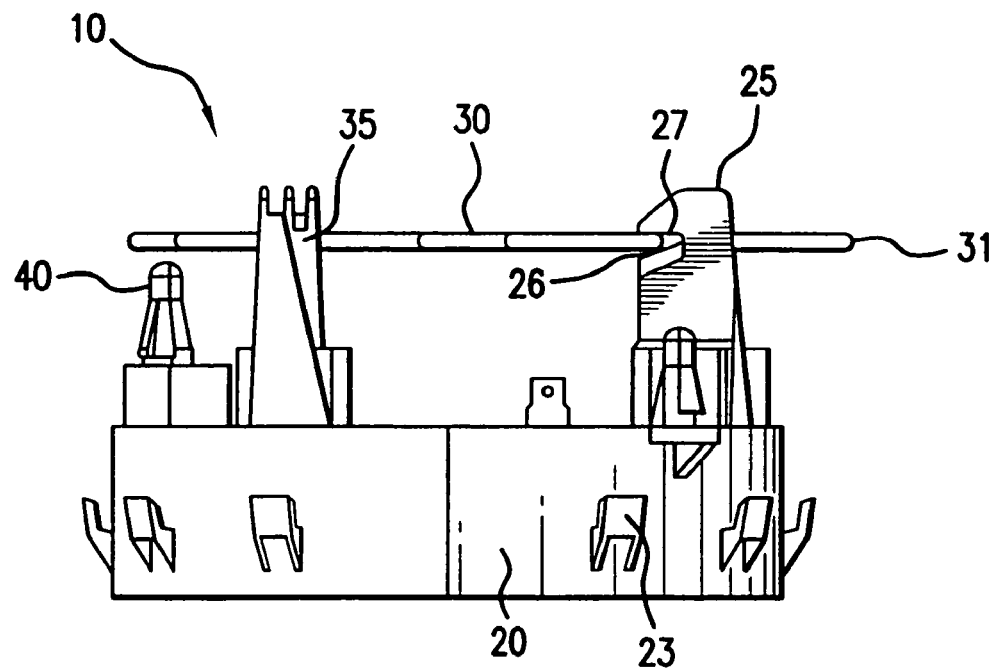
FIG. 5 is a top view of the airbag module shown in FIG. 3.

In one preferred embodiment of this invention, the inflatable restraint airbag cushion 100 is positioned or contained within the compartment 22. As shown in FIGS. 3–5, the housing 20 preferably comprises a plurality of clips or projections 23 for retaining or holding a steering wheel cover 24 over the compartment 22. The steering wheel cover 24 maintains the uninflated inflatable restraint airbag cushion 100 positioned within the compartment 22 until it is desirably deployed or inflated. The inflatable restraint airbag cushion 100 is operatively connected to an inflator device and control assembly (not shown).

While the broader practice of the invention is not necessarily limited to use with or in conjunction with inflator devices of specific construction or operation, the operation will be further described below making reference to a pyrotechnic gas generant-containing inflator device. Those skilled in the art and guided by the teachings herein provided will, however, appreciate that other forms or types of inflator devices, such as known in the art, can, if desired, be used.

During operation of the inflator device, an initiator receives a signal from the control assembly in operational control communication with the inflator device. The control assembly provides a reaction initiating signal to the initiator to initiate reaction of at least a portion of a supply of the gas-generating pyrotechnic material contained within the initiator to produce a combustion product gas. The combustion product gas exits the inflator device to deploy the connected inflatable restraint airbag cushion 100. Any suitable inflator device and/or control assembly known to those skilled in the art and guided by the teachings herein provided can be used in accordance with the invention.

In one preferred embodiment of this invention, at least one and preferably a plurality of first mounting legs 25 extend from the housing 20. As shown in FIGS. 3–5, the first mounting legs 25 are preferably molded or integrated with the housing 20 and extend outwardly in a generally perpendicular direction with respect to a back facing surface of the housing 20. Each first mounting leg 25 forms a groove or notch 26, which defines a pivot point 27. As shown in FIGS. 3–5, two first mounting legs 25 are positioned on or at a first portion of the housing 20.

Referring further to FIGS. 3 and 5, the housing 20 is connected or mounted to a lock spring such as a snap ring 30 and pivotally movable with respect to the vehicular steering wheel 99. For example, a first portion of the snap ring 30 is pivotally mounted within groove 26 and is mountable to the vehicular steering wheel 99. Preferably, the snap ring 30 is made of any suitable material that allows the snap ring 30 to be snapped or pressure fit onto the vehicular steering wheel 99, such as a metal, alloy, plastic and/or composite material. Other suitable materials known to those having ordinary skill in the art and guided by the teachings herein provided having sufficient strength and resiliency can be used to make the snap ring 30. With the snap ring 30 mounted to the vehicular steering wheel, the housing 20 is attached to the snap ring 30 by at least the first mounting legs 25, and the housing 20 is pivotally movable about the pivot point 27 with respect to the vehicular steering wheel 99.

In one preferred embodiment of this invention, the housing 20 further comprises at least one and preferably a plurality of second mounting legs 35. As shown in FIGS. 3–5, second mounting legs 35 are preferably molded or integrated with the housing 20 and extend outwardly in a generally perpendicular direction with respect to the back facing surface of the housing 20. Each second mounting leg 35 forms a gap or depression 36, within which at least a portion of the snap ring 30 is movably positionable. As shown in FIGS. 3–5, two second mounting legs 35 are positioned on or at a second portion of the housing 20 and a second portion of the snap ring 30 is movably positioned within the second mounting legs 35. The second mounting leg gaps 36 allow the housing 20 to move with respect to the vehicular steering wheel as the housing 20 is pivoted about the pivot point 27 defined at the first mounting legs 25. Preferably, each second mounting leg 35 moves with respect to the snap ring 30, which is securely mounted to the vehicular steering wheel 99. In one preferred embodiment of this invention, a portion 31 of the snap ring 30 positioned between the first mounting legs 25 and/or a portion 32 of the snap ring 30 positioned between a first mounting leg 25 and a corresponding second mounting leg 35, as shown in FIGS. 3 and 5, is mountable to the vehicular steering wheel 99.

Referring further to FIGS. 1 and 2, in one preferred embodiment of this invention, the housing 20 further comprises at least one first or upper horn contact element 40 mounted with respect to the housing 20. Preferably, the upper horn contact element 40 is molded or integrated with the housing 20 and extends outwardly in a generally perpendicular direction with respect to the back facing surface of the housing 20. The housing 20 is pivotally movable with respect to the vehicular steering wheel 99 between a first or initial position and a second or horn activating position, wherein the horn contact element 40 contacts a mating or corresponding second or lower contact element 50 mounted with respect to the vehicular steering wheel 99. Preferably, the lower contact element 50 is molded or integrated with the vehicular steering wheel 99 and extends outwardly in a generally perpendicular direction with respect to a front facing surface of the vehicular steering wheel 99, generally in opposing position with respect to the back facing surface of the housing 20. The lower contact element 50 is operatively connected to and/or in electrical communication with a vehicular horn assembly (not shown) to activate the vehicular horn. Any suitable vehicular horn assembly known to those skilled in the art and guided by the teachings herein provided can be used in accordance with the invention.

Thus, the invention provides a snap-in castanet airbag module that is pivotally mountable to a vehicular steering wheel, which can be produced or manufactured and mounted on the vehicular steering wheel in a timely and cost efficient manner.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An airbag module for a vehicular steering wheel, the airbag module comprising:
    a lock spring mountable to the vehicular steering wheel; and
    a housing connected to the lock spring, the housing comprising a first mounting leg connected to the lock spring at a pivot point,
    wherein the housing is pivotally movable about the pivot point with respect to the vehicular steering wheel and the lock spring is pivotally mounted within a groove formed by the first mounting leg.

2. The airbag module of claim 1 wherein the housing comprises a plastic material.

3. The airbag module of claim 1 further comprising an inflatable restraint airbag cushion positioned within the housing.

4. The airbag module of claim 1 further comprising a first horn contact element connected with respect to the housing.

5. The airbag module of claim 4 wherein the housing is movable with respect to the vehicular steering wheel between a first position and a second position, in the second position the first horn contact element contacts a second horn contact element positioned with respect to the vehicular steering wheel to activate the horn.

6. airbag module of for a vehicular steering wheel, the airbag module comprising:
    a lock spring mountable to the vehicular steering wheel; and
    a housing connected to the lock spring, the housing comprising a first mounting leg connected to the lock spring at a pivot point, the housing pivotally movable about the pivot point with respect to the vehicular steering wheel,
    wherein the housing further comprises a second mounting leg, the second mounting leg forming a gap, at least a portion of the lock spring movably positionable within the gap.

7. The airbag module of claim 6 wherein the housing comprises a plastic material.

8. The airbag module of claim 6 further comprising an inflatable restraint airbag cushion positioned within the housing.

9. The airbag module of claim 6 further comprising a first horn contact element connected with respect to the housing.

10. The airbag module of claim 9 wherein the housing is movable with respect to the vehicular steering wheel between a first position and a second position, in the second position the first horn contact element contacts a second horn contact element positioned with respect to the vehicular steering wheel to activate the horn.

11. An airbag module for a vehicular steering wheel, the airbag module comprising:
    a housing having a first mounting leg; and
    a lock spring mounted to the first mounting leg, wherein the housing is pivotally movable about the lock spring with respect to the vehicular steering wheel,
    wherein the first mounting leg forms a groove defining a pivot point, a first portion of the lock spring pivotally mounted within the groove.

12. The airbag module of claim 11 wherein the housing further comprises a second mounting leg forming a gap, a second portion of the lock spring movably positionable within the gap.

13. The airbag module of claim 11 further comprising an inflatable restraint airbag cushion positioned within the housing.

14. An airbag module for a vehicular steering wheel, the airbag module comprising:
    a housing having a first mounting leg; and
    a lock spring mounted to the first mounting leg, wherein the housing is pivotally movable about the lock spring with respect to the vehicular steering wheel,
    wherein the housing is pivotally movable with respect to the vehicular steering wheel to activate a horn.

15. The airbag module of claim 14 wherein the first mounting leg forms a groove defining a pivot point, a first portion of the lock spring pivotally mounted within the groove.

16. The airbag module of claim 15 wherein the housing further comprises a second mounting leg forming a gap, a second portion of the lock spring movably positionable within the gap.

17. The airbag module of claim 14 further comprising an inflatable restraint airbag cushion positioned within the housing.

18. An airbag module for a vehicular steering wheel, the airbag module comprising:
    a housing;
    a first mounting leg formed on the housing, the first mounting leg forming a groove and defining a pivot point;
    a second mounting leg formed on the housing, the second mounting leg forming a gap; and
    a lock spring mounted with respect to the vehicular steering wheel, a first portion of the lock spring pivotally mounted within the groove formed by the first mounting leg and a second portion of the lock spring movably positioned within the gap formed by the second mounting leg, wherein the housing is pivotally movable about the pivot point with respect to the vehicular steering wheel.

19. The airbag module of claim 18 wherein the housing is pivotally movable with respect to the vehicular steering wheel to activate a horn.

* * * * *